UNITED STATES PATENT OFFICE.

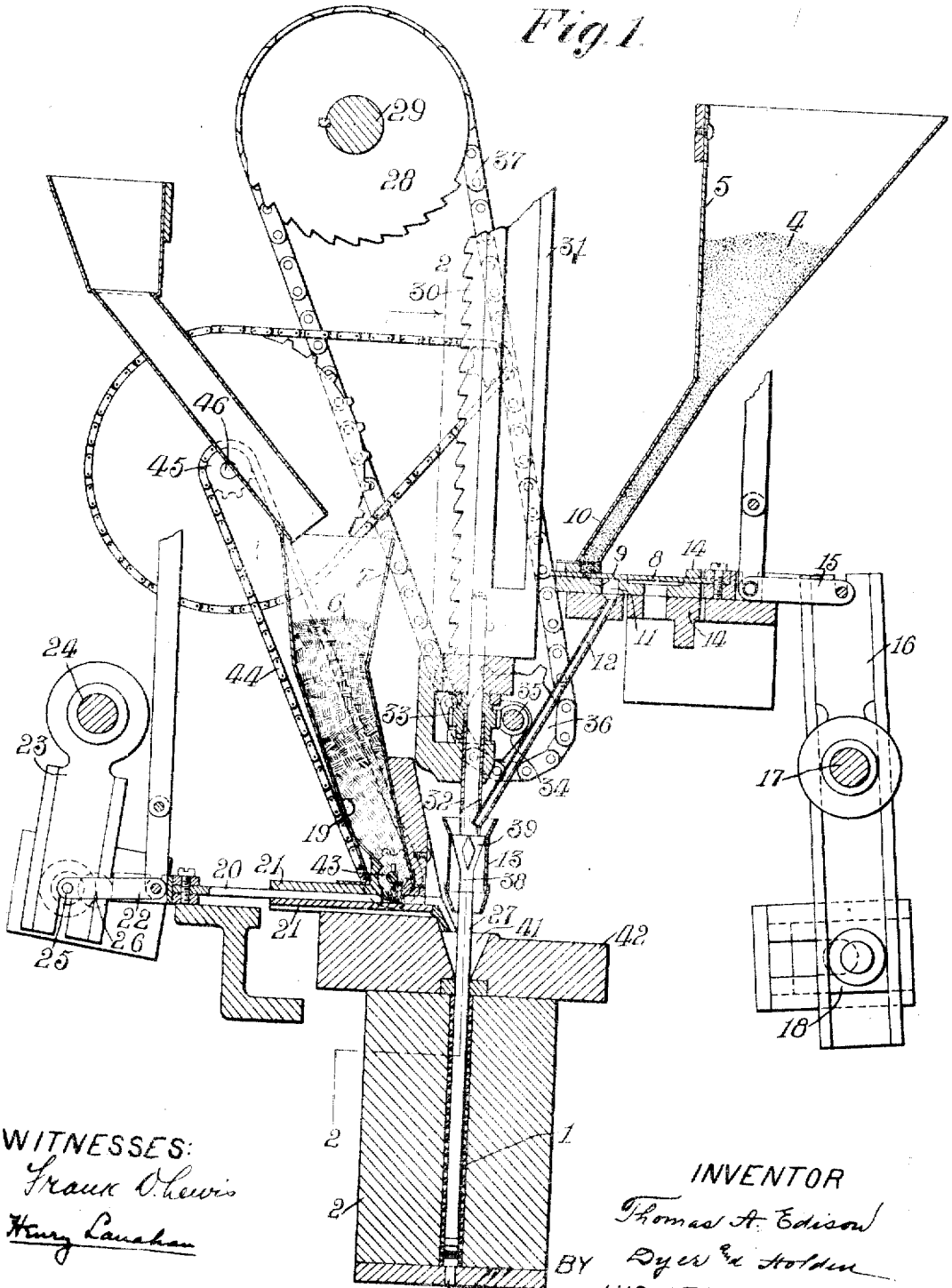

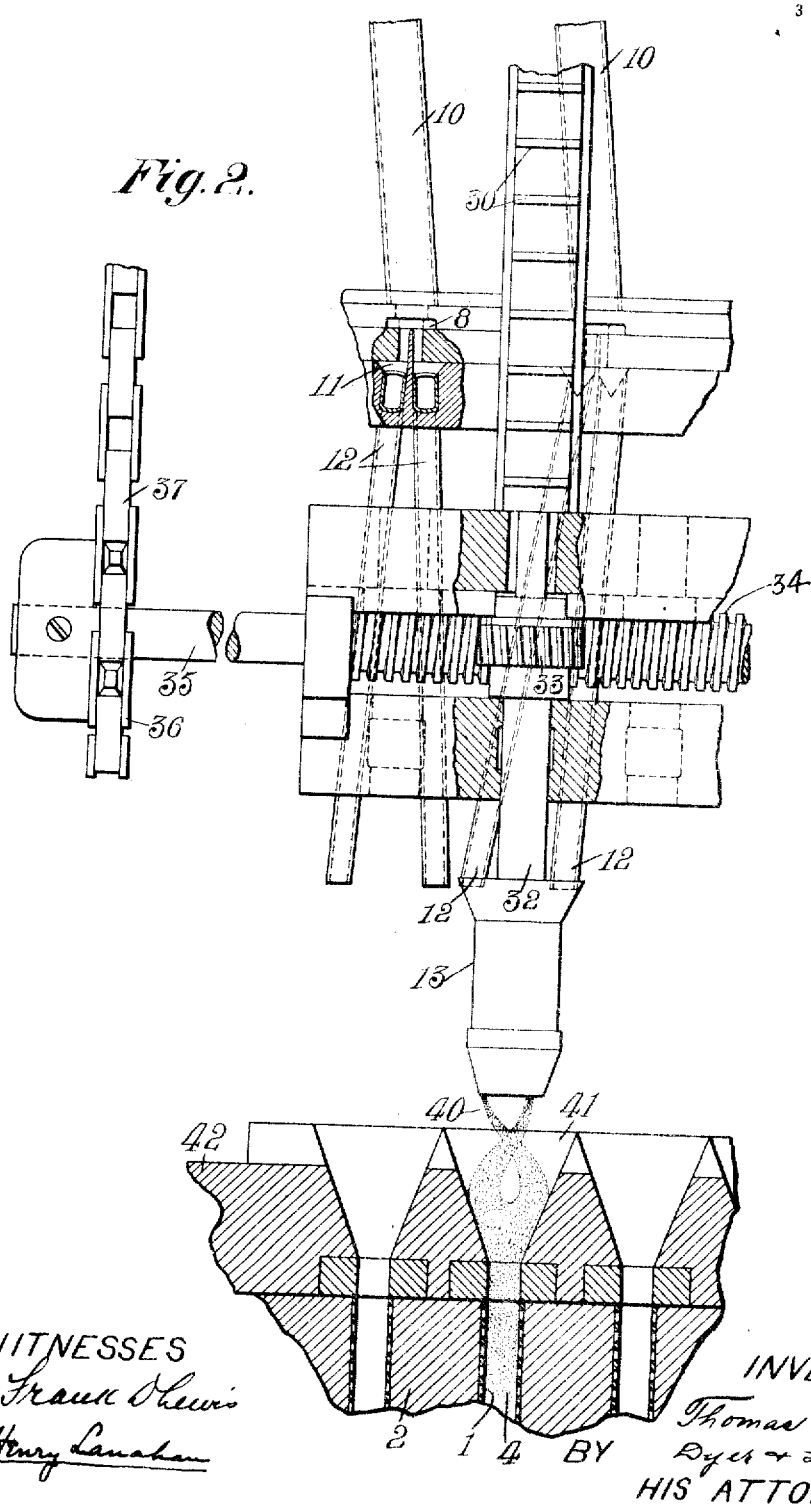

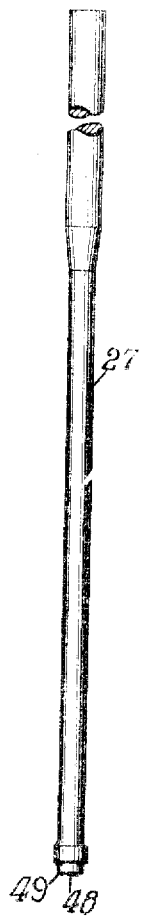
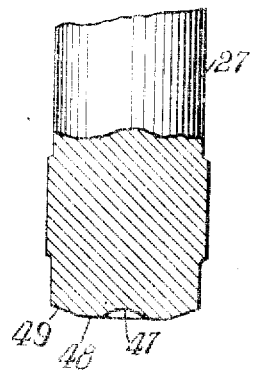
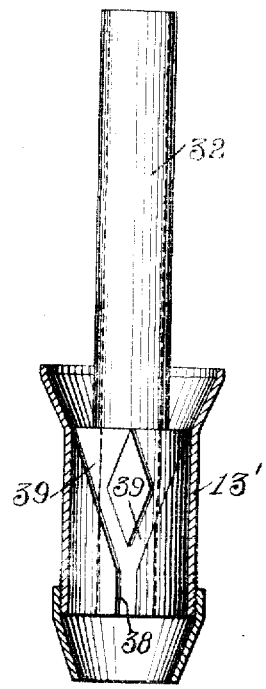
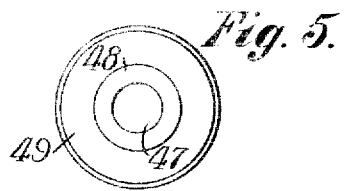
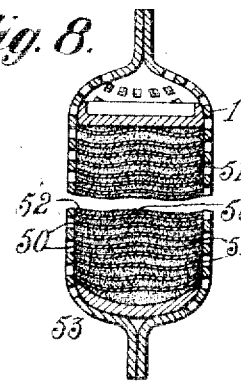

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

PRODUCTION OF ELECTRODE ELEMENTS.

1,198,426. Specification of Letters Patent. Patented Sept. 19, 1916.

Original application filed June 17, 1910, Serial No. 567,371. Divided and this application filed August 31, 1914. Serial No. 859,362.

*To all whom it may concern:*

Be it known that I, THOMAS A. EDISON, a citizen of the United States, and a resident of Llewellyn Park, West Orange, Essex county, New Jersey, have invented certain new and useful Improvements in the Production of Electrode Elements, of which the following is a description.

My invention relates to the production of electrode elements for storage batteries and more especially to a process for making the same.

My invention comprises an improvement upon the method of making storage battery electrodes disclosed in my Patent No. 880,979, granted March 3, 1908.

My prior application Serial No. 567,371, filed June 17, 1910, on which Patent No. 1,115,463 was granted on October 27, 1914 and of which this application is a division, contains claims on the improved electrode element produced by the process forming the subject matter of this application.

My improved process has been perfected particularly for the purpose of carrying on in an improved manner the automatic filling and tamping of active material into small perforated tubes, the ends of which are adapted to be subsequently closed, after which a number of such tubes will be mounted in a suitable grid to constitute a storage battery electrode, as described in some of my previous patents. It will be understood, however, that the invention may be used for other purposes.

The objects of my invention are chiefly directed to the production of an improved electrode element comprising a perforated tubular pocket containing alternate layers of active material and conductive material contained therein under high pressure.

Some of the particular improvements reside in the manner in which the active material is loaded within the tube and in the manner of applying pressure to the material in the tube by tamping, so as to compress the material within the tube adjacent to the walls of the same at least as highly as in the center of the tube, to insure firm contact between the layers of conductive material and the walls of the tube, and to insure uniform distribution of the materials within the tube. Consequently, my invention comprises a process for loading and tamping the material within the tubular electrode in such a manner as to form an electrode having the desired characteristics.

Other objects of my invention will appear in the following specification and appended claims.

It is extremely important that the active material and conductive material should be contained within the inclosing tube in such a tightly compressed condition that relative movement of the conducting flakes and the active material shall be prevented. The active and conductive material should be uniformly distributed in the tube and good contact always preserved between the conductive material and the active material and the tube itself, which is also formed of conductive metal. In my present invention, I load the tubes by feeding alternately small increments of active material, as nickel hydroxid, and a conductive material, as nickel flake, into the tube, and compressing the same preferably by delivering a tamping blow upon the material in the tube after each alternate charge. I have found that the best results are obtained by imparting a rotating or centrifugal motion to the active material as it is fed into the upper end of the tube, so that as it begins to fall into the tube, it is in the form of a rotating or swirling ring or hollow cylinder closely adjacent to the inner walls of the tube. Some of this material is deflected toward the center of the tube by contact with the inner walls thereof, but a considerable portion falls adjacent to the falls of the tube so that a layer of quite uniform thickness is thus formed in the tube.

The apparatus preferably employed in carrying out my improved process comprises a plunger which is operated to deliver tamping blows upon the material after each increment of conductive material has been fed therein. This plunger is formed with a tamping face which is preferably hollowed out in a curved form at the center, and which is so formed as to first strike the material in the tube at some distance from the center. The tamping face of the plunger also preferably slopes away from the portion last described to the outside edge, the result being that the material is more tightly compressed near the edge than in the center of the tube, and the material adjacent to the walls of the tube is forced into firm contact with the latter by the sloping portion of the tamping face. By this means, firm contact of the nickel flake adjacent to the walls of the tube with the latter and with the active material is assured. The layers of active and conductive material are also compressed in a bent or wavy form by this action, so that the area of contact between the same is increased.

My copending application Serial No. 82376, filed March 6, 1916, and entitled Tube filling and tamping machine, is a division hereof and contains claims covering my improved apparatus.

In order that a clear understanding of my invention may be had, attention is directed to the accompanying drawings forming part of this specification, and illustrating one form of apparatus by which my improved process may be carried out and also illustrating the improved electrode element formed thereby.

In the drawings, Figure 1 represents a vertical partial cross section through a tube filling and tamping machine for carrying out my improved process, some of the parts being shown in side elevation. Fig. 2 represents a partial cross section taken on line 2—2 in Fig. 1, some of the parts being shown in side elevation. Fig. 3 represents the tamping plunger employed in the machine illustrated in side elevation. Fig. 4 is an enlarged longitudinal cross section of the lower end of the same. Fig. 5 is a bottom plan view of the same drawn to the same scale as Fig. 4. Fig. 6 is an enlarged detail, partly in side elevation and partly in section, of the rotating hopper shown in Fig. 1. Fig. 7 is a bottom plan view of the same; and Fig. 8 is a partial longitudinal cross section through an electrode element produced by my improved process.

The perforated metal tubular pocket 1 is supported in a vertical position within the holder or tube support 2, the projection 3 extending upwardly a slight distance upon the lower end of the tube to form a support for the material to be loaded therein. The active material 4, which preferably contains finely divided nickel hydroxid, is contained within a hopper 5, and the conductive material 6, which is preferably electrolytically active nickel flake, is contained within a hopper 7. A slide 8 is provided with a pocket 9 for carrying the active material in small uniform increments from the lower end of chute 10 descending from hopper 5 to the upper end 11 of tubes 12 by which it is fed into the hopper 13, from which it falls into tube 1 supported in tube holder 2.

Slide or carrier 8 is reciprocated in slideways 14 by means of link 15 connected to lever 16 which is oscillated about shaft 17 by means of eccentric 18. The nickel flake 6 is fed forwardly in small measured increments from the lower end of chute 19 extending downwardly from hopper 7 into the upper end of tube 1 at a point just below the lower end of hopper 13. The charges of nickel flake or conductive material are fed into the tube by means of slide or carrier 20 which is reciprocated within guides 21 by connection with link 22 which is connected to crank 23 which is pivoted on shaft 24. Link 22 is pinned to crank 23 at 25 and this point revolves about center 26, reciprocating the slide 20 as described. Tamping plunger 27 extends through the center of hopper 13 and is lifted by means of ratchet wheel 28 upon shaft 29 which coacts with ratchet teeth 30 formed upon slide 31 connected to the upper edge of plunger 27 to lift the latter and allow it to fall successively within tube 1 to deliver tamping blows upon the material in the tube. It will be understood that first a charge of active material is introduced into the tube, then a charge of conductive material, after which the plunger is operated to compress the material within the tube, and the cycle of operation is continued until the tube is filled, a complete machine embracing a plurality of similar parts for filling a plurality of tubes at the same time preferably being employed, although only one tube and apparatus for filling the same are illustrated for simplicity.

Hopper 13 is provided for the purpose of imparting a rotary or centrifugal motion to the nickel hydroxid or active material just before it enters the tube 1. The hopper 13 comprises a tube 32 open at both ends and through which the tamping plunger 27 passes. Tube 32 has an enlarged lower portion fitted into a sleeve 13' (see Fig. 6) which forms the external wall of the hopper and which has an upper edge portion flared outwardly and a lower converging edge portion. On the exterior of the enlarged lower portion of the tube 32 there are provided a number, preferably two, of pairs of channels or grooves 39 converging downwardly into vertical channels or grooves 38. The tube 32 has secured upon the upper end thereof a worm wheel 33 which meshes with worm 34 carried upon shaft 35 which also carries sprocket wheel 36 which is driven by sprocket chain 37, the latter being driven from a sprocket wheel carried by shaft 29 as shown. The result of this construction is that when an increment of active material is delivered by tubes 12 into the upper end of rotating hopper 13, the finely divided active material falls through channels 39 into channels 38 within hopper 13 where it has imparted to it the rotary motion of hopper 13 and falls from the lower end of the hopper in a swirling form as shown at 40 in Fig. 2, falling into the V-shaped hopper or chute 41 carried by plate 42, which chute guides the active material in the form of a rotating annulus into the upper end of tube 1. Preferably, two tubes 12 are provided for carrying active material from each carrier 8 to each rotating hopper 13, the capacity of the tubes and the channels 38 in the hopper 13 being properly proportioned to carry the desired amount of material in a charge. Immediately after the rotating charge of active material has been dumped into the tube as described, a charge of nickel flake is dumped on top of the same by means of carrier or slide 20, and plunger 27 which has been raised, is immediately released to deliver a tamping blow upon the same. The nickel flake may be agitated in the lower end of chute 19 by means of rotating agitator 43 which is rotated by any suitable means, as by sprocket chain 44, which passes over sprocket wheel 45 upon shaft 46.

Tamping plunger 27 is preferably provided upon its tamping face with a circular central recess 47 concentric with the axis of the plunger. Surrounding the cavity of recess 47 is a flat annular portion 48 and surrounding the latter and extending to the outer edge of the tamping face is a surface 49 which slopes slightly back or upwardly. The result of this construction is that when the plunger descends upon the material in the tube, the latter will be most tightly compressed under the annular portion 48 of the plunger, the material in the tube being curved upwardly slightly at the center because of the curved surface 47 of the tamp, the material in the tube being also bent slightly upward between the portion 48 of the tamp and the outside edge of the same by sloping surface 49, which also serves to force the material by a wedging action into firm contact with the inside wall of the tube. When next the tamp descends after charges of nickel flake and hydroxid have been fed into the tube, the latter will have filled the tube substantially to the same level, that is, the material which has fallen upon the high central point will have run down to a considerable extent into the hollow formed by portion 48 of the tamping face, so that the material under surface 48 of the tamping face will again be highly compressed upon the fall of the tamping plunger and the material adjacent to the wall of the tube again forced into firm contact therewith and bent slightly upwardly by sloping surface 49 of the tamping face. The result of this action is to form alternate layers of active and conductive material in the tube 1 in the curved or wavy form shown in Fig. 8, in which thin curved layers 50 of conductive nickel hydroxid alternate with layers 51 of the active material which are thicker than the layers 50 of nickel flake. It will be noted that all the layers are bent slightly upwardly adjacent the sides of the tube 1, as shown at 52, and curved slightly upwardly in the center as shown at 53. Thus, it will be seen that the material is tightly compressed adjacent to the walls of the tube and that the nickel flake forms good contact with the latter and with the active material. It is not necessary that the material should be quite so tightly compressed in the center of the tube as adjacent the edges.

Having now described my invention, what I claim and desire to protect by Letters Patent is as follows:—

1. The process of loading a tubular storage battery electrode element, which consists in feeding charges of active material into the open upper end of the tube and giving a rotary movement to the material as it falls into the tube, and applying pressure to the material in the tube after each feeding charge, substantially as described.

2. The process of loading a tubular storage battery electrode element, which consists in introducing active material into the open end of the tube as a rotating annulus, the outer diameter of the annulus being substantially the same as that of the bore of the tube, substantially as described.

3. The process of loading a tubular storage battery electrode element, which consists in supporting the tube in a vertical position with its upper end open, imparting centrifugal motion to the active material to be fed therein, and introducing the same into the open upper end of the tube, so that it impinges against the inside walls of the tube and falls by gravity therein, substantially as described.

4. The process of loading a tubular storage battery electrode element, which consists in supporting the tube in a vertical position with its upper end open, imparting centrifugal motion to a measured charge of active material, introducing the same into the open upper end of the tube so that it impinges against the inside walls of the tube and falls by gravity therein, introducing a measured charge of conducting material within said tube upon the layer of active material so formed therein, applying pressure upon the layers of material within the tube, and repeating the cycle of operations until the tube is filled, substantially as described.

5. The process of loading a tubular storage battery electrode element, which consists in supporting the tube in a vertical position with its upper end open, introducing charges of active material therein in finely divided condition in a ring-like formation, with alternate charges of conductive material, and applying tamping pressure after each alternate charge, substantially as described.

6. The process of forming a storage battery electrode element, which consists in introducing within a perforated tubular conductive pocket alternate layers of finely divided active material, and conductive material, the active material being introduced therein chiefly adjacent to the inner wall of the pocket, and applying pressure to the material in the pocket after alternate charges in such a manner as to cause the layers of active material to bend upwardly adjacent to the walls of the pocket, substantially as described.

7. The process of forming a storage battery electrode element, which consists in introducing within a perforated tubular conductive pocket alternate layers of finely divided active material and conductive material in such a manner that the active material does not tend to heap up unevenly in the pocket, and applying pressure to the material in the pocket after alternate charges in such a manner as to cause the layers of active material to bend adjacent to the walls of the pocket into firm contact therewith, substantially as described.

8. The process of forming a storage battery electrode element, which consists in introducing within a perforated tubular conductive pocket alternate layers of finely divided active material and conductive material in such a manner that the active material does not tend to heap up unevenly in the pocket, and applying pressure to the material in the pocket after alternate charges, substantially as described.

9. The method of making an electrode element, which consists in introducing alternate increments of active material and flake-like conductive material within a tubular perforated pocket or receptacle and compressing the material, substantially as described.

10. The method of making an electrode element, which consists in introducing alternate increments of active material and flake-like conductive material within a tubular perforated pocket or receptacle, and in applying a tamping pressure to each alternate increment after its introduction therein, substantially as described.

11. The method of making an electrode element, which consists in introducing alternate increments of active material and flake-like conductive material within a tubular perforated pocket or receptacle, and applying tamping pressure thereto, substantially as described.

This specification signed and witnessed this 27th day of August, 1914.

THOS. A. EDISON.

Witnesses:
HENRY LANAHAN,
MARY J. LAIDLAW.

material, and applying tamping pressure after each alternate charge, substantially as described.

6. The process of forming a storage battery electrode element, which consists in introducing within a perforated tubular conductive pocket alternate layers of finely divided active material, and conductive material, the active material being introduced therein chiefly adjacent to the inner wall of the pocket, and applying pressure to the material in the pocket after alternate charges in such a manner as to cause the layers of active material to bend upwardly adjacent to the walls of the pocket, substantially as described.

7. The process of forming a storage battery electrode element, which consists in introducing within a perforated tubular conductive pocket alternate layers of finely divided active material and conductive material in such a manner that the active material does not tend to heap up unevenly in the pocket, and applying pressure to the material in the pocket after alternate charges in such a manner as to cause the layers of active material to bend adjacent to the walls of the pocket into firm contact therewith, substantially as described.

8. The process of forming a storage battery electrode element, which consists in introducing within a perforated tubular conductive pocket alternate layers of finely divided active material and conductive material in such a manner that the active material does not tend to heap up unevenly in the pocket, and applying pressure to the material in the pocket after alternate charges, substantially as described.

9. The method of making an electrode element, which consists in introducing alternate increments of active material and flake-like conductive material within a tubular perforated pocket or receptacle and compressing the material, substantially as described.

10. The method of making an electrode element, which consists in introducing alternate increments of active material and flake-like conductive material within a tubular perforated pocket or receptacle, and in applying a tamping pressure to each alternate increment after its introduction therein, substantially as described.

11. The method of making an electrode element, which consists in introducing alternate increments of active material and flake-like conductive material within a tubular perforated pocket or receptacle, and applying tamping pressure thereto, substantially as described.

This specification signed and witnessed this 27th day of August, 1914.

THOS. A. EDISON.

Witnesses:
HENRY LANAHAN,
MARY J. LAIDLAW.

---

Correction in Letters Patent No. 1,198,426.

It is hereby certified that in Letters Patent No. 1,198,426, granted September 19, 1916, upon the application of Thomas A. Edison, of Llewellyn Park, West Orange, New Jersey, for an improvement in "Production of Electrode Elements," an error appears in the printed specification requiring correction as follows: Page 1, line 90, for the word "falls" read *walls*; and that the said Letters Patent should be read with this correction therein that the same may conform to the record of the case in the Patent Office.

Signed and sealed this 13th day of February, A. D., 1917.

[SEAL.]

R. F. WHITEHEAD,
*Acting Commissioner of Patents.*

Cl. 100—57.

It is hereby certified that in Letters Patent No. 1,198,426, granted September 19, 1916, upon the application of Thomas A. Edison, of Llewellyn Park, West Orange, New Jersey, for an improvement in "Production of Electrode Elements," an error appears in the printed specification requiring correction as follows: Page 1, line 90, for the word "falls" read *walls;* and that the said Letters Patent should be read with this correction therein that the same may conform to the record of the case in the Patent Office.

Signed and sealed this 13th day of February, A. D., 1917.

[SEAL.]

R. F. WHITEHEAD,
*Acting Commissioner of Patents.*

Cl. 100—57.